No. 652,481. Patented June 26, 1900.
D. G. HYDER.
MUD FENDER FOR VEHICLE WHEELS.
(Application filed Mar. 1, 1898.)
(No Model.)
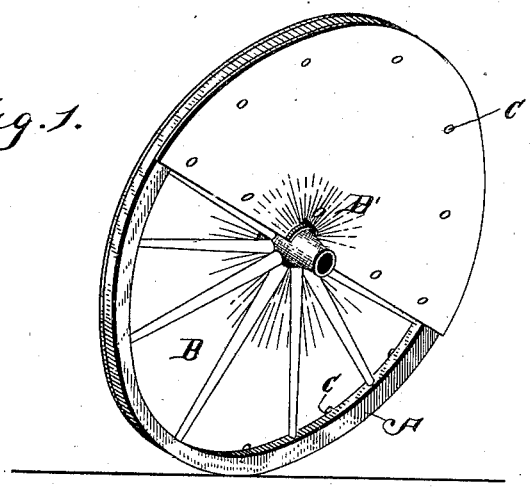
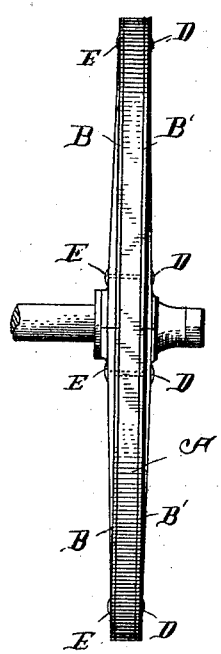
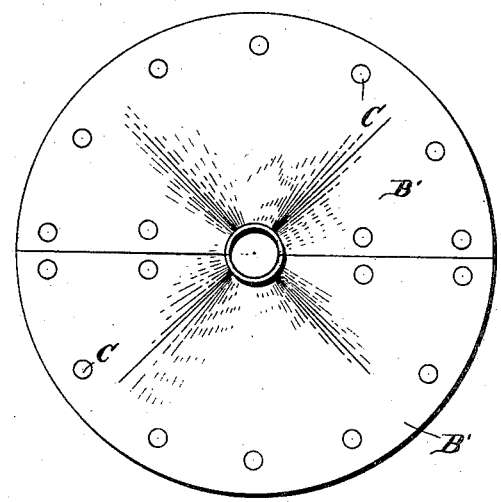
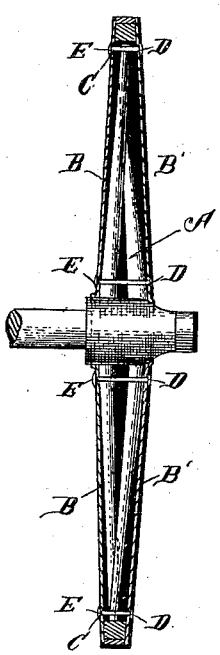
Witnesses.
F. C. Barry
M. F. Haskell
Inventor.
D. G. Hyder
per O. E. Duff
Attorney.

UNITED STATES PATENT OFFICE.

DOCTOR G. HYDER, OF BELLTON, GEORGIA.

MUD-FENDER FOR VEHICLE-WHEELS.

SPECIFICATION forming part of Letters Patent No. 652,481, dated June 26, 1900.

Application filed March 1, 1898. Serial No. 672,193. (No model.)

*To all whom it may concern:*

Be it known that I, DOCTOR G. HYDER, of Bellton, in the county of Hall and State of Georgia, have invented certain new and useful Improvements in Mud-Fenders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to mud-guards for vehicle-wheels.

The object of the invention is to protect the wheel from getting clogged with dirt and earth between the spokes and on the rims.

It is well known to country people and others who travel on dirt roads that during wet weather, and particularly in the springtime when the frost is coming out of the ground, such roads frequently become impassable and wheels sink in the mud up to their hubs, rendering them extremely heavy and hard to pull. To avoid these objections and to protect the wheel are objects of my invention; and to these ends my invention consists in the improved construction of wheel which will be hereinafter fully described, and its points of novelty specifically set forth in the claims.

In the drawings, Figure 1 is a perspective view of the wheel constructed in accordance with my invention, one-half of each disk being removed. Fig. 2 is an edge view in elevation of the wheel. Fig. 3 is a vertical section; Fig. 4, a view of the disk in side elevation. Figs. 5 and 6 show a preferred form of bolt and nut.

The same letters indicate like parts in the several figures, in which—

A is the wheel, having rim, spokes, hub, and tire of any ordinary construction. B and B' are the disks, and C the bolt-holes. D are the bolts, and E the screw-nuts. These disks B and B' are made in semicircular sections, each covering one-half of one side of the wheel. For small wheels the disks may each be made of a single sheet of metal, but for large wheels the disk is made in halves or in section, as above indicated, although metal sheets may be rolled sufficiently large to make the disks of a single piece to cover a large wheel. Apertures are formed centrally in the disk for the hub and holes for the bolts. The bolt-heads D and nuts E, I prefer to make as thin as possible, with heads round, thinned to a knife-edge, to have the exterior of the disks as smooth as possible, so that the mud will not adhere thereto. I prefer to provide the nuts and bolt-heads with small holes for the insertion of a bifurcated or pronged wrench instead of square heads and nuts. It is obvious that when the metal is sufficiently thick the holes for the bolts may be countersunk, so that they will be flush with the sides of the disk.

When the parts are put together, the disk is first placed on the wheel, fitting snugly around the tire and against the rim, the holes in the disks on each side registering with each other. The bolts are then inserted through the holes and the nuts screwed tight. It is evident that bolts may be passed through any portion of the disk to stiffen it and to prevent bulging or displacement.

It is obvious that the disks by preventing the mud from adhering to the wheel not only facilitate the passage of the wheels through the mud, but protect the paint and varnish from being eaten off by the acids in the mud and clay, as is well known to be the case by carriage-owners and others. When the roads are good, the disks may be removed.

The disks may be made to fit the prevailing sizes of wheels, so that they may be purchased and shipped in sets the same as wheels are now. Should it be necessary to form the disk with a covering for the hub (not shown) to prevent the mud, sand, or muddy water or the like from entering the axle-boxes, this can be done by making hub-boxes either on the disk itself or making them separately and securing them on the hubs or disks in any approved manner.

From the foregoing it will be apparent that I have produced a simple, cheap, and easily-applied guard which may be placed on wheels already in use without in any wise altering the wheels or boring holes in any part thereof and which when removed leaves no mark to show where it was attached.

What I claim is—

1. A detachable mud-fender for vehicle-wheels composed of sheet metal and fitting snugly about the hub of the wheel, and extending therefrom to the periphery of the wheel and over the edge of the tire, but independent of the tire, said fender being provided near its central opening and near its periphery between the spokes of the wheel, and at points between the rim and hub, with bolt-holes for the purpose of receiving bolts, which bolts are entirely independent of the wheel, said wheel having no holes or openings to receive said bolts, substantially as described.

2. A detachable mud-fender for vehicle-wheels composed of sheet metal extending from the hub to and over the edge of the tire, but independent of said tire, said fender being held to the wheel by bolts which extend between the spokes, said spokes or wheel having no holes or openings for said bolts, substantially as described.

In testimony that I claim the foregoing as my own I affix my signature in presence of two witnesses.

DOCTOR G. HYDER.

Witnesses:
ROBT. F. QUILLIAN,
A. I. NOYES.